United States Patent
Graziosi et al.

(10) Patent No.: US 10,657,689 B2
(45) Date of Patent: May 19, 2020

(54) METHOD AND APPARATUS FOR POINT CLOUD COLOR PROCESSING

(71) Applicant: Sony Corporation, Tokyo (JP)

(72) Inventors: Danillo Graziosi, San Jose, CA (US); Arash Vosoughi, San Jose, CA (US)

(73) Assignee: SONY CORPORATION, Tokyo (JP)

(*) Notice: Subject to any disclaimer, the term of this patent is extended or adjusted under 35 U.S.C. 154(b) by 7 days.

(21) Appl. No.: 16/100,033

(22) Filed: Aug. 9, 2018

(65) Prior Publication Data
US 2019/0318519 A1 Oct. 17, 2019

Related U.S. Application Data

(60) Provisional application No. 62/658,271, filed on Apr. 16, 2018, provisional application No. 62/657,378, filed on Apr. 13, 2018.

(51) Int. Cl.
*G06T 11/40* (2006.01)
*G06T 3/00* (2006.01)
(Continued)

(52) U.S. Cl.
CPC .......... *G06T 11/40* (2013.01); *G06T 3/0037* (2013.01); *H04N 19/186* (2014.11); *H04N 19/86* (2014.11); *G06T 2207/10028* (2013.01)

(58) Field of Classification Search
None
See application file for complete search history.

(56) References Cited

U.S. PATENT DOCUMENTS 9,524,572 B2 12/2016 Narayanan et al.
10,242,484 B1* 3/2019 Cernigliaro .......... G06T 11/001
(Continued)

FOREIGN PATENT DOCUMENTS

WO WO2018067052 4/2018

OTHER PUBLICATIONS

PU-Net: Point Cloud Upsampling Network; https://www.researchgate.net/publication/322652760_PU-Net_Point_Cloud_Upsampling_Network; Lequan Yu, Xianzhi Li, Chi-Wing Fu, Pheng-Ann Heng; Jan. 1, 2018.
(Continued)

*Primary Examiner* — Peter Hoang
(74) *Attorney, Agent, or Firm* — Trellis IP Law Group, PC

(57) ABSTRACT

A method for reducing color leaking artefacts in an image formed by projection processing from a 3D point cloud comprises: receiving an input image comprising the 3D point cloud; classifying the cloud into a plurality of surface patches; projecting the patches onto a plane to form a first 2D image; processing the first 2D image, by coding, transmitting and decoding, to form a final 2D image; and providing the final 2D image as an output. Processing comprises at least one of: coding comprising independent patch processing to reduce inter-patch color leakage; coding comprising background filling of pixels between patches to reduce inter-patch color leakage; coding comprising applying a chroma down-sampling scheme, based on depth and color value, that reduces intra-patch color leakage; and decoding comprising post-filtering to detect potential intra-patch color leakage, followed by an adaptive chroma up-sampling scheme that reduces intra-patch color leakage.

12 Claims, 14 Drawing Sheets

(51) Int. Cl.
H04N 19/186 (2014.01)
H04N 19/86 (2014.01)

(56) References Cited

U.S. PATENT DOCUMENTS

2013/0218472 A1* 8/2013 Fu .................. G06K 9/00637
702/5
2017/0347120 A1 11/2017 Chou

OTHER PUBLICATIONS

"PCC Test Model Category 2 v0" 120. MPEG Meeting; Oct. 23, 2017-Oct. 27, 2017; MACAU; (Motion Picture Expert Group or ISO/I EC JTC1/SC29/WG11), No. NI7248, Dec. 15, 2017 (Dec. 15, 2017), XP030023909.
Ohji Nakagami et al: "Point cloud compression technology proposal by Sony", 120. MPEG Meeting; Oct. 23, 2017-Oct. 27, 2017; MACAU; (Motion Picture Expert Group or ISO/IEC JTC1/SC29/WG11), No. m41665, Oct. 18, 2017 (Oct. 18, 2017), XP030070007.
Kwan-Jung Oh et al: "Hole filling method using depth based in-painting for view synthesis in free viewpoint television and 3-D video A", Picture Coding Symposium 2009; May 6, 2009-May 8, 2009; Chicago, May 6, 2009 (May 6, 2009), XP030081803.

* cited by examiner

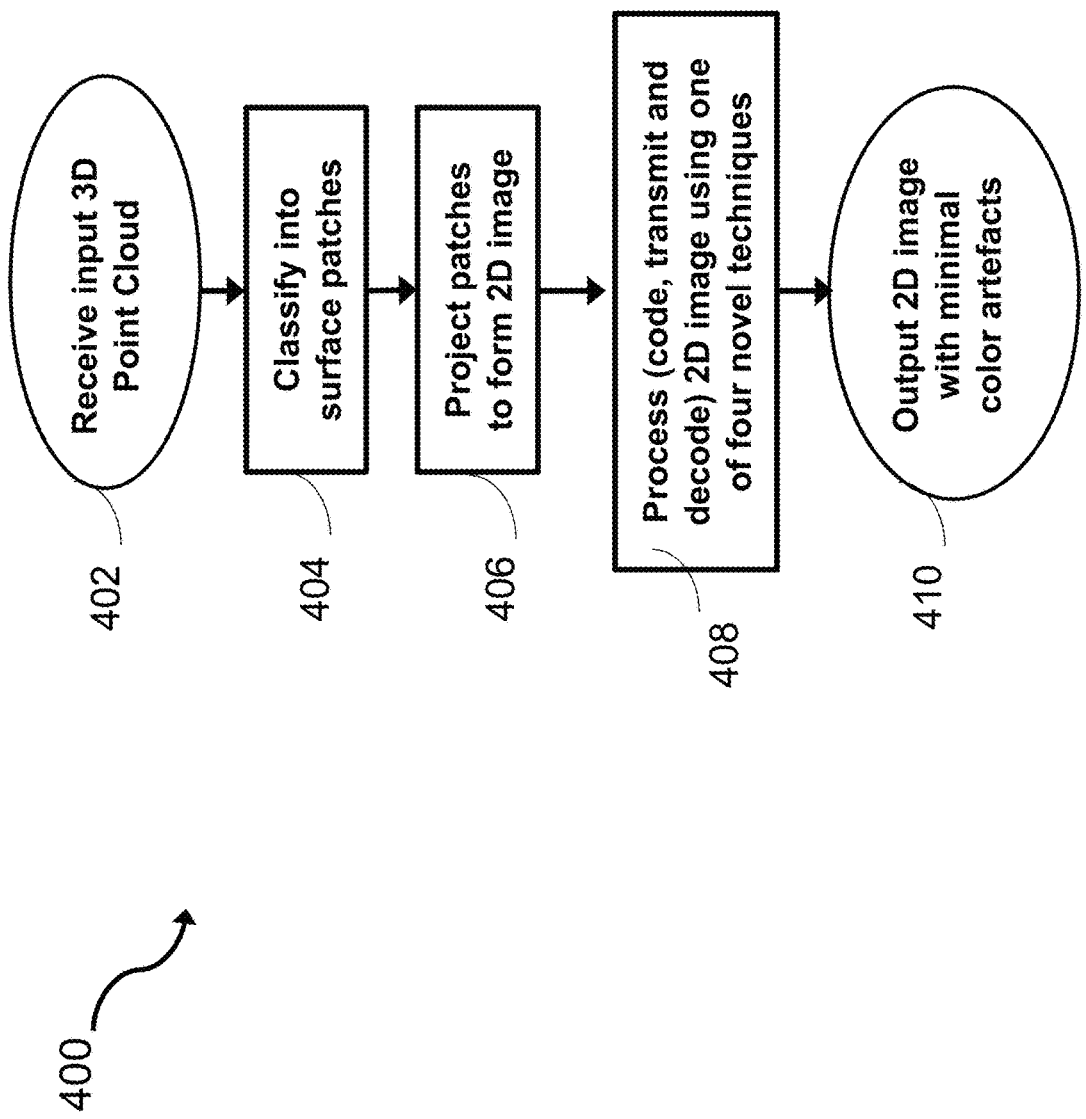

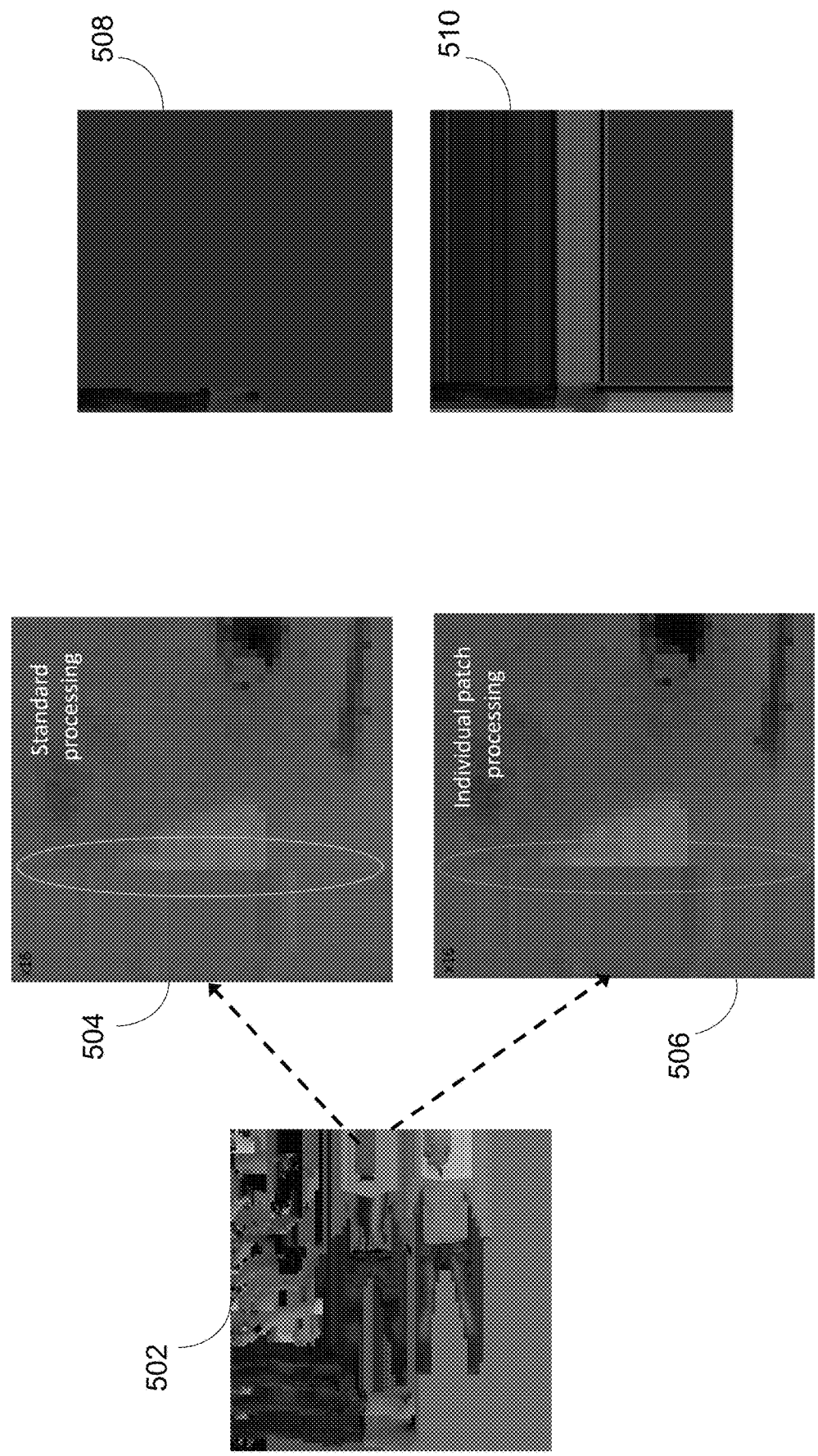

Figure 6C

Figure 7C

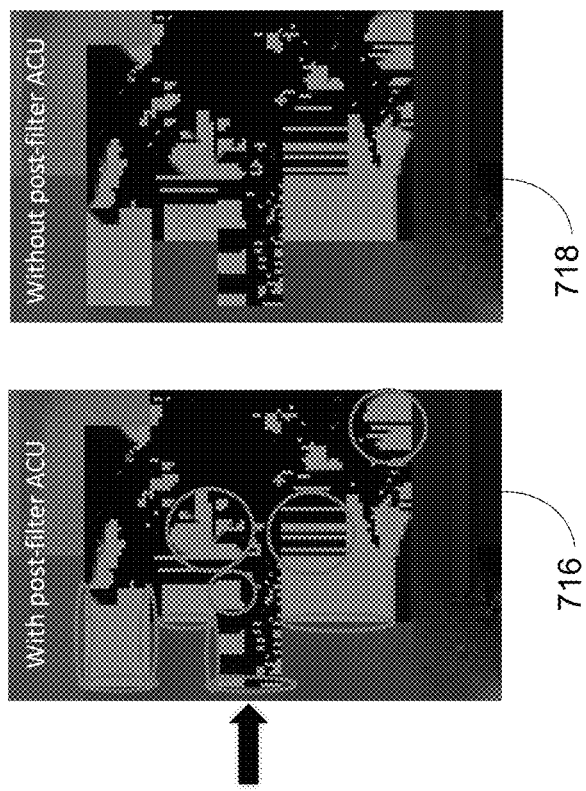

Find the smoothest connected region $j$ around the current pixel by inspecting the below pixel configurations (could be either in depth or Luma):

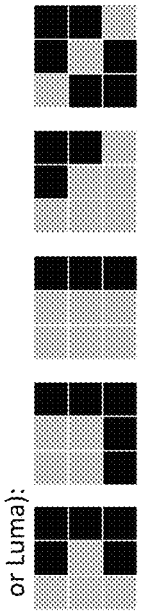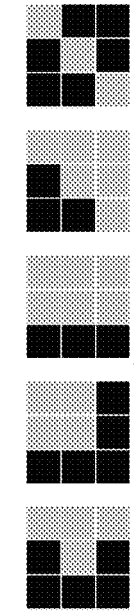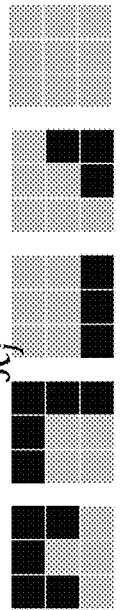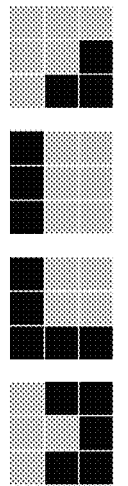

$\mathcal{R}_j$

For each region $\mathcal{R}_j$, compute:
$$\frac{\sum_{\delta_i \in \mathcal{R}_j} \delta_i}{|\mathcal{R}_j|} = \Delta_j$$

Then find:
$$j^* = \arg\min \Delta_j$$

Example: if $j^* = 1$

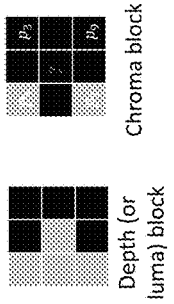

Depth (or luma) block    Chroma block $$? = \frac{p_1 + p_2}{2}$$

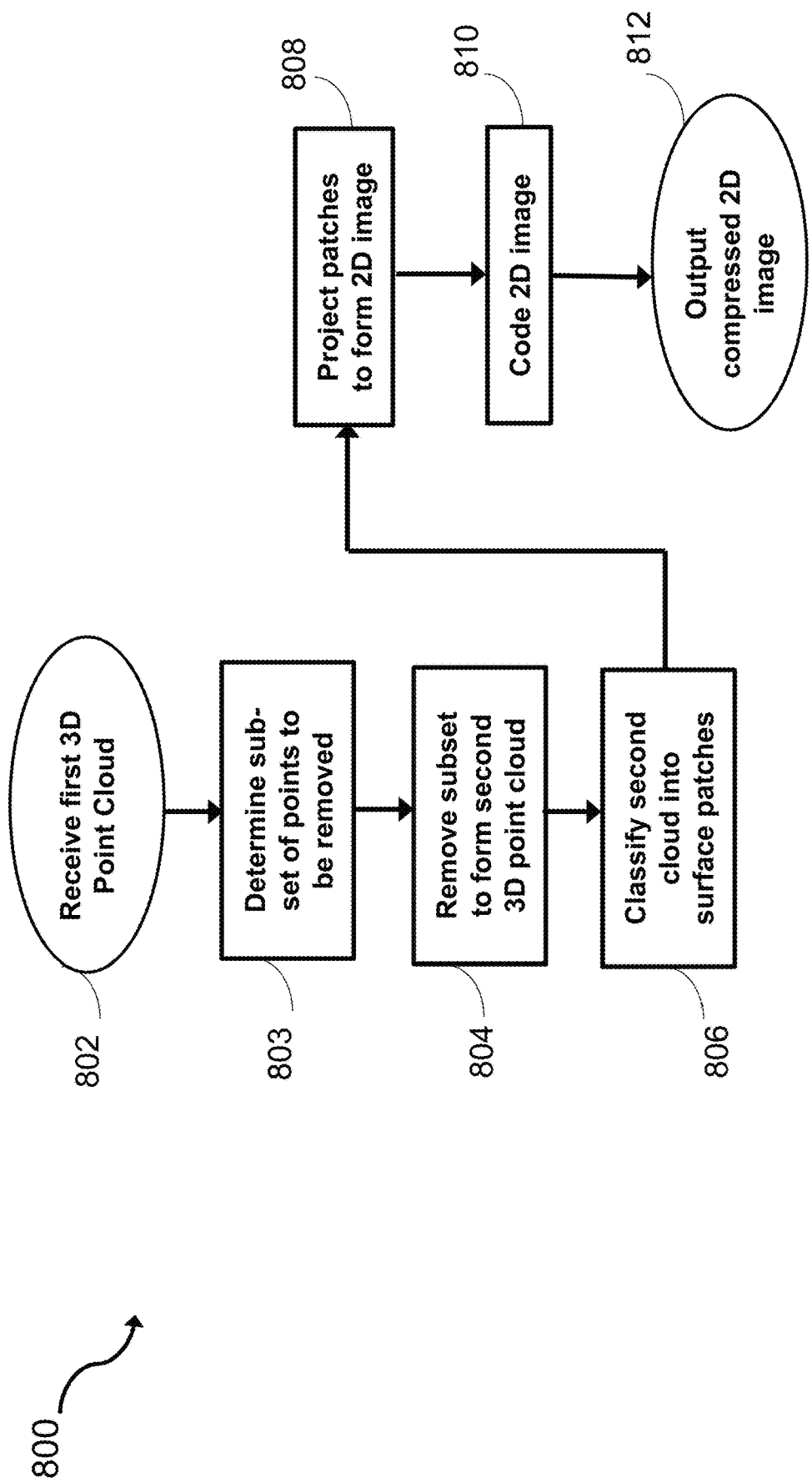

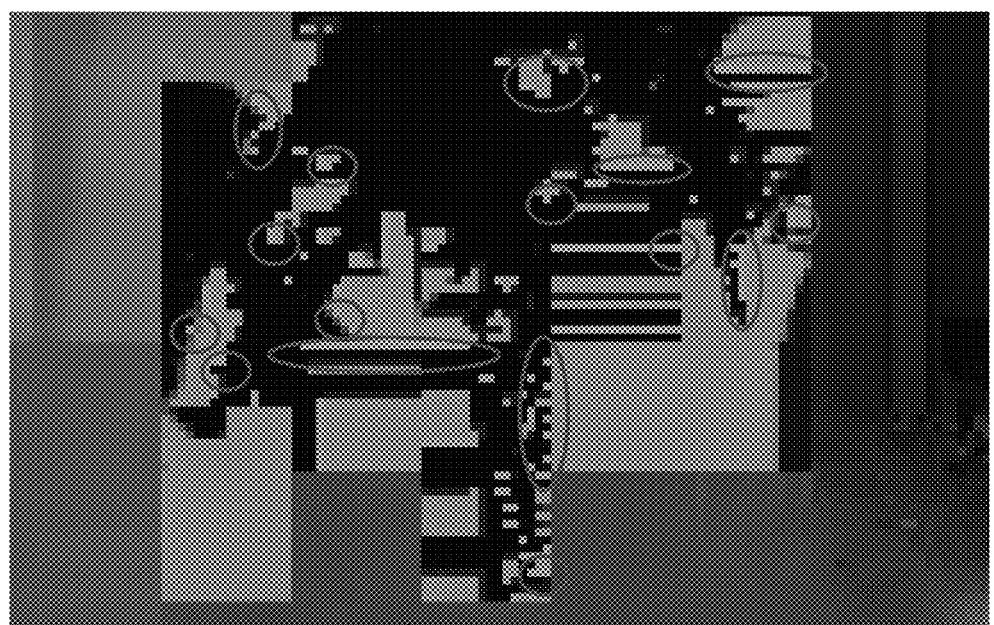
Figure 9

METHOD AND APPARATUS FOR POINT CLOUD COLOR PROCESSING

CROSS REFERENCES TO RELATED APPLICATIONS

This application claims the benefit of U.S. Provisional Patent Application Ser. No. 62/657,378, entitled COLOR LEAKING IN POINT CLOUD CODING, filed on Apr. 13, 2018 (Client ref. 201805899.01) and U.S. Provisional Patent Application Ser. No. 62/658,271, entitled COLOR LEAKING IN POINT CLOUD CODING, filed on Apr. 16, 2018 (Client ref. 201805899.02), which are hereby incorporated by reference as if set forth in full in this application for all purposes.

BACKGROUND

Since 2017, point clouds have been considered as a candidate format for transmission of 3D data, either captured by 3D scanners, LIDAR sensors, or used in popular applications such as VR/AR. A point cloud is a set of points representing the target object in 3D space. Besides the spatial position (X, Y, Z), each point usually has associated attributes, such as color (R, G, B) or even reflectance and temporal timestamps (e.g., in LIDAR images). In order to obtain a high-fidelity representation of the target 3D objects, devices capture point clouds in the order of thousands or even millions of points. Moreover, for dynamic 3D scenes used in VR/AR video applications, every single frame often has a unique, very dense point cloud, which means the transmission of several millions of point clouds per second is required. For a viable transmission of such large amount of data, compression is often applied.

Two different technologies for point cloud compression are currently under consideration by MPEG. One is 3D native coding technology (based on octree and similar coding methods); the other is 3D to 2D projection, followed by traditional video coding. In the case of dynamic 3D scenes, MPEG is using a test model software (TMC2) based on patch surface modeling, projection of patches from 3D to form 2D images, and coding the 2D images with video encoders such as HEVC. This method has proven to be more efficient than native 3D coding, and it is able to achieve competitive bitrates at acceptable quality. FIG. 1 illustrates some steps of this method as practiced prior to the present invention, showing a representation 102 of the 3D object of interest, the classification or breakdown of this representation into 3D surface patches, 104, the projection of these patches onto a 2D image plane to form 2D patches such as patch 106, 2D image packing 108, and a background filling scheme, including patch dilation, as shown in 110. These steps will now be discussed in more detail.

When processing point clouds, TMC2 classifies the points according to the direction of their normal, and group connected components with similar classification. This results in three-dimensional patches of surface that are then projected onto a 2D axis-aligned plane, whose orientation depends on the classification of the points in the patch. The projections of the patch surface serve two purposes: to represent the position of the points in 3D space by recording the distance of the point to the projection plane, and to represent their respective color values. Each 2D projected patch is placed into a 2D image, resulting in one sequence with depth images, and another sequence with texture (color) values (RGB). Notice that the projected data do not cover all the pixels in the 2D image. For those positions that are not covered, a dilation operation will fill in the missing positions. In the case of the depth sequence, an HEVC video codec typically packs the depth images into the luminance (Y) channel of a video stream and compresses the sequence of depth images as a regular YUV420 sequence. In some cases, instead of HEVC, another video encoder such as H.264 may be used. Similarly, in some cases, depth information could be broken down into three planes, coded with 24 bits, and packed into Y, U and V channels.

For the texture (RGB) data, TMC2 first converts the RGB data into YUV420, then codes the converted video sequence. For the texture, color sub-sampling commonly generates artifacts such as color leaking for sharp colored edges. Unnatural sharp color edges may occur due to the projection of patch surfaces to 2D axis-aligned planes. Furthermore, the placement of patches in the 2D image can also generate artificial color edges between patches. Color leaking artifacts in such color edges can appear in the 3D point cloud as visible color artifacts, reducing the quality of the reconstructed point cloud. Hereafter, in this disclosure, the term "chroma", a standard term, well understood to those of skill in the art of video compression, is used interchangeably with "color".

Color artefacts in the projected images may be visible between and/or within the 2D patches. FIG. 2 illustrates the issue of inter-patch color leakage. Image 202 is uncompressed, image 204 has been coded using a high resolution ("444") color sub-sampling scheme, and image 206 has been coded using a more standard, lower resolution ("420") color sub-sampling scheme. Image block 208 shows how part of the starting 3D image may be broken up into 3D surface patches, and image block 210 shows the projection of such patches onto a 2D plane before either of the "444" or "420" coding schemes is applied. The "420" coding scheme may be considered preferable to the "480" scheme in the context of efficient data transmission, as the more highly compressed data can be transmitted faster, and/or on a less expensive transmission channel. However, a zoomed in view 214 of part of the "420" coded image shows significant color leakage, while a corresponding zoomed in view 212 of the "444" coded image shows negligible color leakage. In other words, the demands of efficient data transmission create inter-patch color artefact problems.

FIG. 3 similarly illustrates the issue of intra-patch color leakage. A single patch is shown at image block 302, coded using a "420" color sub-sampling scheme; the same patch coded using a "444" scheme is shown at image block 304. Zoomed in views of the projected, 2D versions of these patches are shown at blocks 306 and 308 respectively. The same parameters (lossless texture, lossy geometry) were used in setting up HDR tools in both cases. The scheme resulting in more highly compressed data is seen to result in significant color leakage between edges within the patch (see the regions bounded by ovals in 306), while the corresponding edges produced by the lower compression scheme (seen in 308) are free of such leakage problems.

There is therefore a need to mitigate the color leaking artifacts, both inter-patch and intra-patch, that are typically produced due to chroma sub-sampling during the process of 3D point cloud coding.

SUMMARY

Embodiments generally relate to methods and apparatus for reducing color leaking artefacts in image formed by projection processing from 3D point clouds.

In one embodiment, the method comprises: receiving an input image comprising the 3D point cloud; classifying the 3D point cloud into a plurality of 3D surface patches; projecting the 3D surface patches onto a 2D image plane to form a first 2D image; processing the first 2D image by coding, transmitting and decoding, to form a final 2D image; and providing the final 2D image as an output. Processing comprises at least one of: coding comprising independent patch processing to reduce inter-patch color leakage in the final 2D image; coding comprising background filling of pixels between patches to reduce inter-patch color leakage in the final 2D image; coding comprising applying a chroma down-sampling scheme, based on depth and color value, that reduces intra-patch color leakage in the final 2D image; and decoding comprising post-filtering to detect potential intra-patch color leakage, followed by an adaptive chroma up-sampling scheme that reduces intra-patch color leakage in the final 2D image.

In another embodiment, the method comprises: receiving an input image comprising a first 3D point cloud; removing a sub-set of points from the first 3D point cloud to form a second 3D point cloud: classifying the second 3D point cloud into a plurality of 3D surface patches; projecting the 3D surface patches onto a 2D image plane to form a first 2D image; coding the first 2D image to form a compressed 2D image; and providing the compressed 2D image as an output. The sub-set of points removed from the first 3D point cloud to form a second 3D point cloud is determined by: analyzing the first 3D cloud to detect points whose projection onto a 2D image plane would cause color leakage artefacts within projected patches; and classifying the detected points as the sub-set to be removed.

In another embodiment, an apparatus comprises: one or more processors; and logic encoded in one or more non-transitory media for execution by the one or more processors and when executed operable to: receive an input image comprising a 3D point cloud; classify the 3D point cloud into a plurality of 3D surface patches; project the 3D surface patches onto a 2D image plane to form a first 2D image; process the first 2D image, by coding, transmitting and decoding, to form a final 2D image; and provide the final 2D image as an output. Processing comprises at least one of: coding comprising independent patch processing to reduce inter-patch color leakage in the final 2D image; coding comprising background filling of pixels between patches to reduce inter-patch color leakage in the final 2D image; coding comprising applying a chroma down-sampling scheme, based on depth and color value, to reduce intra-patch color leakage in the final 2D image; and decoding comprising post-filtering to detect potential intra-patch color leakage, followed by an adaptive chroma up-sampling scheme that reduces intra-patch color leakage in the final 2D image.

In yet another embodiment, an apparatus comprises: one or more processors; and software encoded in one or more non-transitory computer-readable media for execution by the one or more processors and when executed operable to reduce color leaking artefacts in an image formed by projection processing from a 3D point cloud, by: receiving an input image comprising the 3D point cloud; classifying the 3D point cloud into a plurality of 3D surface patches; projecting the 3D surface patches onto a 2D image plane to form a first 2D image; processing the first 2D image by coding, transmitting and decoding, to form a final 2D image; and providing the final 2D image as an output. Processing comprises at least one of: coding by independent patch processing to reduce inter-patch color leakage in the compressed 2D image; coding by background filling of pixels between patches to reduce inter-patch color leakage in the compressed 2D image; coding by applying a chroma down-sampling scheme, based on depth and color value, that reduces intra-patch color leakage in the compressed 2D image; and decoding by post-filtering to detect potential intra-patch color leakage, followed by an adaptive chroma up-sampling scheme that reduces intra-patch color leakage in the final 2D image.

A further understanding of the nature and the advantages of particular embodiments disclosed herein may be realized by reference of the remaining portions of the specification and the attached drawings.

BRIEF DESCRIPTION OF THE DRAWINGS

FIG. 4 is a flowchart for a color artefact-reducing method according to some embodiments.

FIG. 5 illustrates the effectiveness of one embodiment of the method shown in FIG. 4.

FIG. 6C illustrates the effectiveness of pixel displacement and background fill in one exemplary case.

FIG. 7C illustrates the effectiveness of interpolation around the pixels identified during the steps of FIG. 7B.

FIG. 8 is a flowchart for a color artefact-reducing method according to some embodiments.

FIG. 9 illustrates the effectiveness of color-consistent patch projection in one exemplary case.

DETAILED DESCRIPTION OF EMBODIMENTS

FIG. 4 is a flowchart for a method 400 for reducing color leaking artefacts in an image formed by projection processing from a 3D point cloud according to several embodiments of the present invention. At step 402, an input image comprising the 3D point cloud is received. At step 404, the 3D point cloud is classified into a plurality of 3D surface patches. At step 406, the 3D surface patches are projected onto a 2D image plane to form a first 2D image. At step 408, the first 2D image is processed (involving coding, transmission and decoding) and at step 410, a final 2D image is provided as an output.

In a first set of embodiments, the coding carried out at step 408 comprises independent patch processing to reduce inter-patch color leakage in the compressed 2D image. FIG. 5 illustrates the effectiveness of this technique in one exemplary case. 502 shows a plurality of projected patches in the first 2D image, the result of step 406 described above. 504 is a view of how part of one of those projected patches would look if standard coding techniques were to be carried out, using HDR tools to carry out color sub-sampling of patches over the entire 2D projected image as an initial step of the coding. 506 shows a corresponding view of the same projected patch, derived from the same original 3D point cloud image that would have resulted in view 502, but in this case, the color sub-sampling has been performed separately on each patch of the first 2D image, before the final result was re-combined into a 2D sequence for further coding. Examination of the vertical edges within the oval outlined regions in views 504 and 506 shows that color leakage at the edge of the patch is significantly reduced in the latter case. View 508 shows the texture of one single 3D patch; view 510 shows the same patch at one stage of its processing, separately from other patches, in this case after a dilation operation.

In a second set of embodiments, the coding carried out at step 408 comprises a pre-processing step of background filling of pixels between patches to reduce inter-patch color leakage in the compressed 2D image. The active pixels (meaning non-background pixels that significantly contribute to the image) within but near a border of each patch are displaced, and then replaced by background-filled pixels. The idea behind this is that as color leaking between patches only affects pixels at the patch borders, if those pixels are replaced by pixels having the attributes of the background, subsequent coding and compression should not introduce color leakage artefacts at those borders.

Figure 6B:
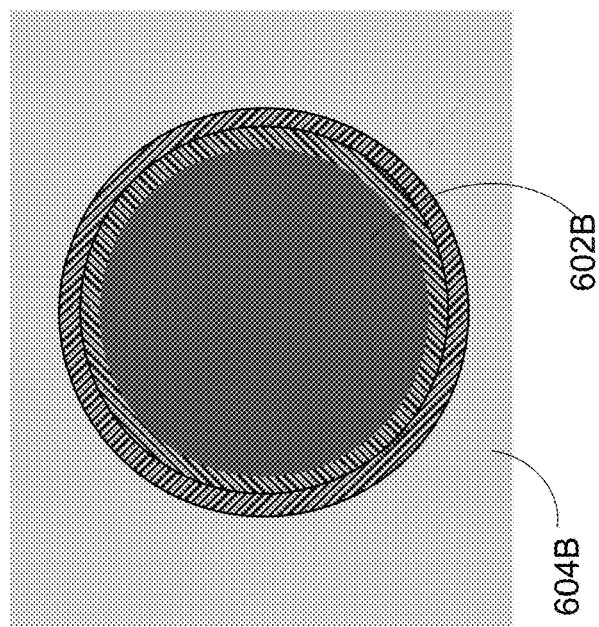
FIG. 6B shows a pixel displacement and background fill technique according to another embodiment.
Figure 6A:
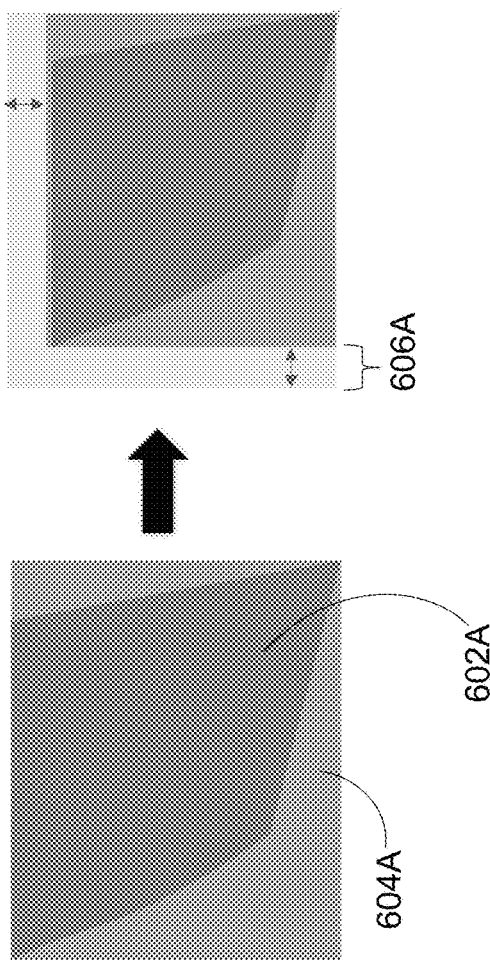
FIG. 6A shows a pixel displacement and background fill technique according to one embodiment.

FIG. 6A shows one way in which pixels may be displaced near a patch border—linear orthogonal shifts of background pixels 602A by a predetermined distance from the border towards the patch interior with active pixel region 604A. This "safeguard" distance 606A, conveniently expressed in terms of a number of pixels, may be programmable, and known to the coder and subsequent decoder. In some cases, safe-guard distance 606A may be 2-3 pixels. FIG. 6B illustrates a technique in which the active pixel region is first dilated, in an annular fashion, extending the texture content of active pixels 602B in each patch radially outwards into the background 604B, in this case by two pixels, before any patch border displacement occurs. This allows the inside texture to be preserved even after compression.

By extending the texture content of the patches into the background, we create pixels in the background with similar values, and even though they will not be used, they help improve compression performance and preserve the real texture from elements inside the patch.

FIG. 6C illustrates the effectiveness of such background filling techniques in one exemplary case. View 612 on the left shows an image processed and coded conventionally, while view 614 shows the result of processing the same original 3D point cloud but using a border pixel displacement and background filling technique as described above. Inspection of regions such as those outlined by the oval annotations shows a significant reduction in inter-patch color leakage in the latter case.

Figure 1:
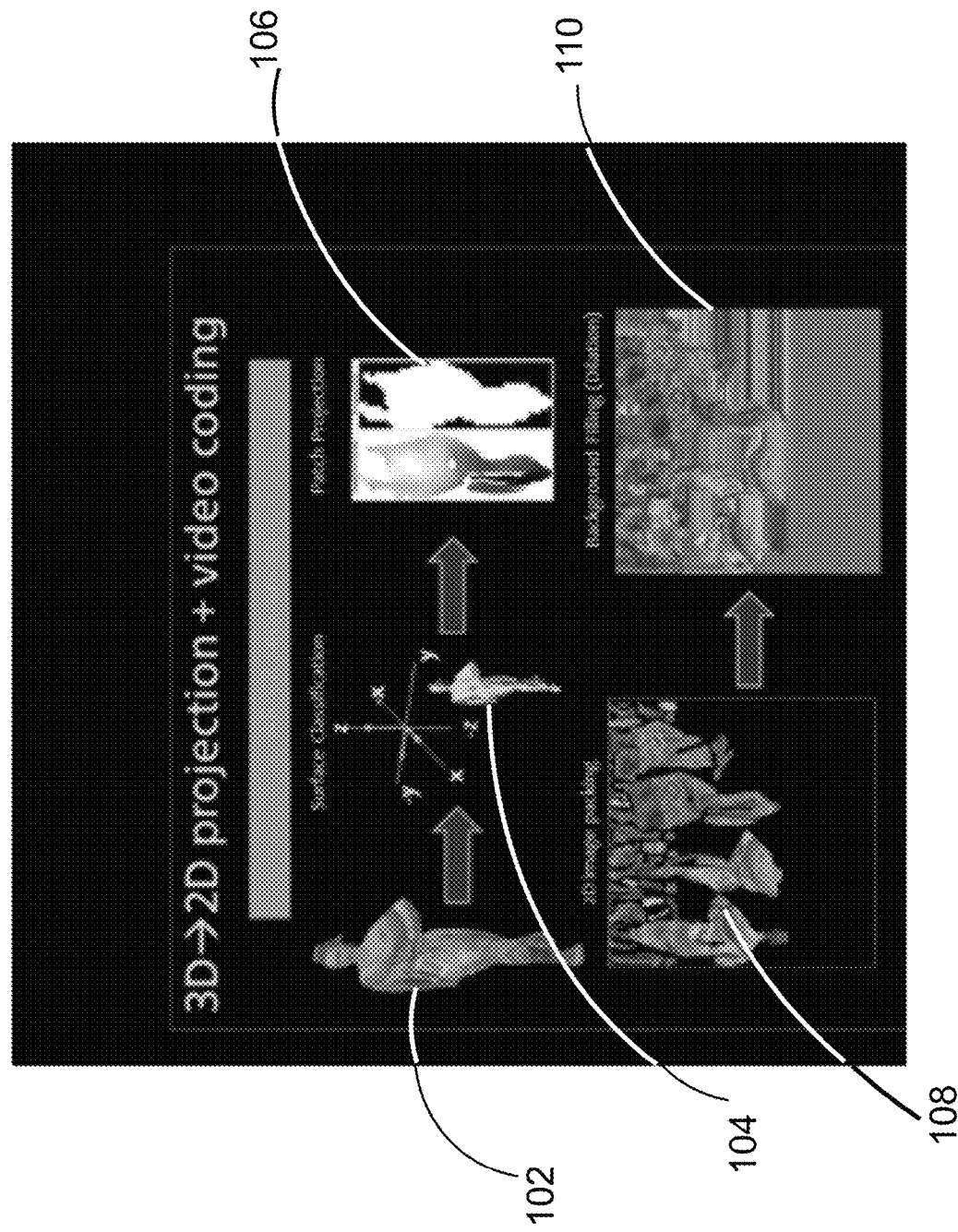
FIG. 1 (Prior Art) illustrates point cloud compression and coding techniques involving 3D to 2D projection.
Figure 2:
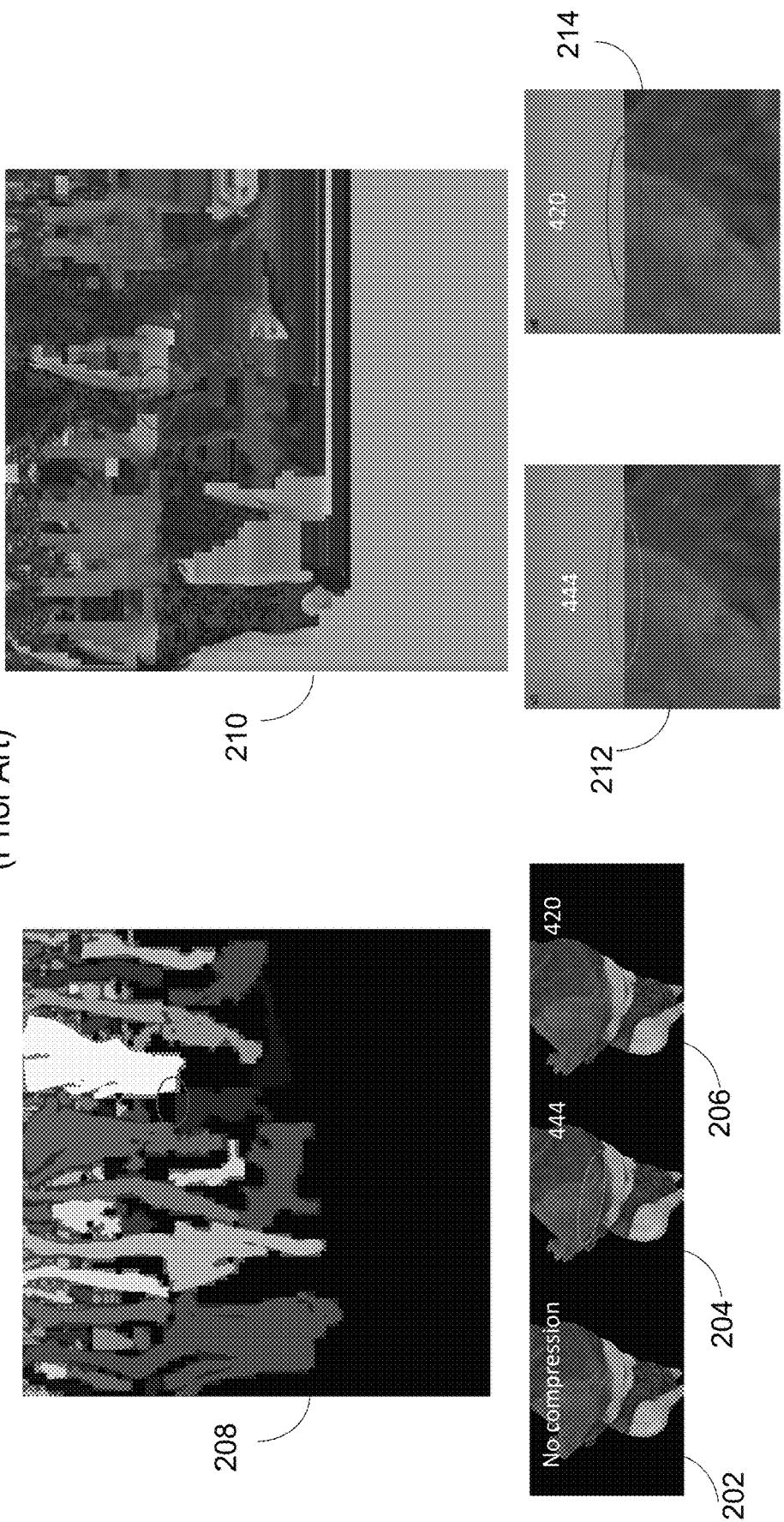
FIG. 2 (Prior Art) illustrates the issue of inter-patch color leakage using current point cloud compression and coding techniques involving 3D to 2D projection.
Figure 3:
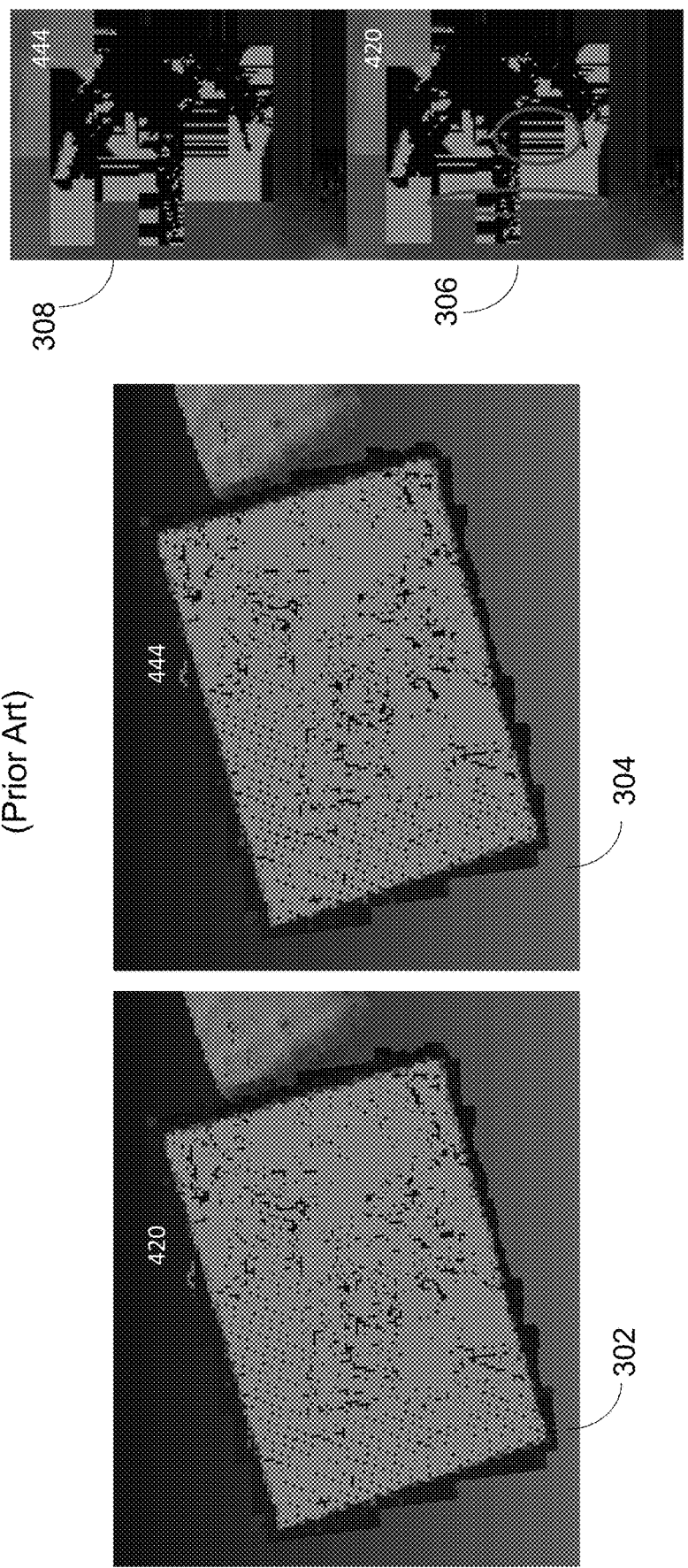
FIG. 3 (Prior Art) illustrates the issue of intra-patch color leakage using current point cloud compression and coding techniques involving 3D to 2D projection.

It should be noted that in point cloud coding via patch projection, the compressed 2D patches may not match exactly like the uncompressed patches (due to quantization/coding effects) and this may create artefacts when the final 2D output image is re-projected back (after the coding, transmitting, and decoding described elsewhere in this disclosure) to reconstruct a final 3D representation of the point cloud. For one example of how problems may occur, see image block 210 in FIG. 2, which shows widely separated 2D patches, representing parts of the person's face, that originated from adjacent 3D surface patches in the original point cloud classification result. In other cases, not shown, there may be an overlap of compressed 2D patches rather than an undesirably great separation. In all such cases, a subsequent reconstruction to 3D will be likely to include visible artefacts.

Prior to the present invention, background pixels would simply be discarded by the decoder. In some embodiments of this invention, background pixels that would (prior to this invention) be discarded by the decoder, are instead used by the decoder to avoid or minimize the artefacts that would appear due to the sort of "patch seam mismatch" just described, by replicating information across patches, acting like a guiding filter for the border regions of those patches.

Figure 6D:
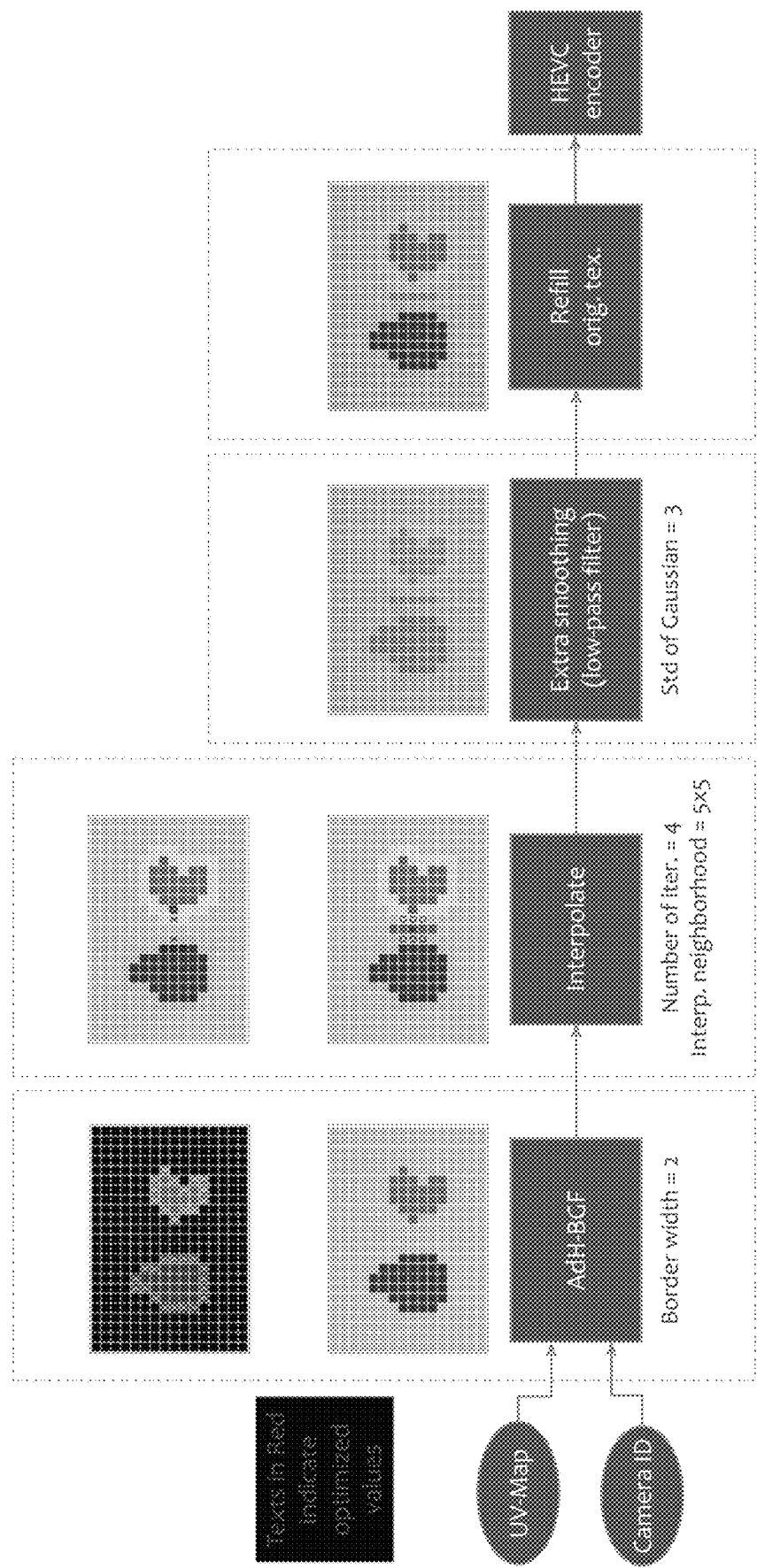
FIG. 6D schematically shows steps of an ad-hoc background fill technique according to one embodiment.
Figure 6E:
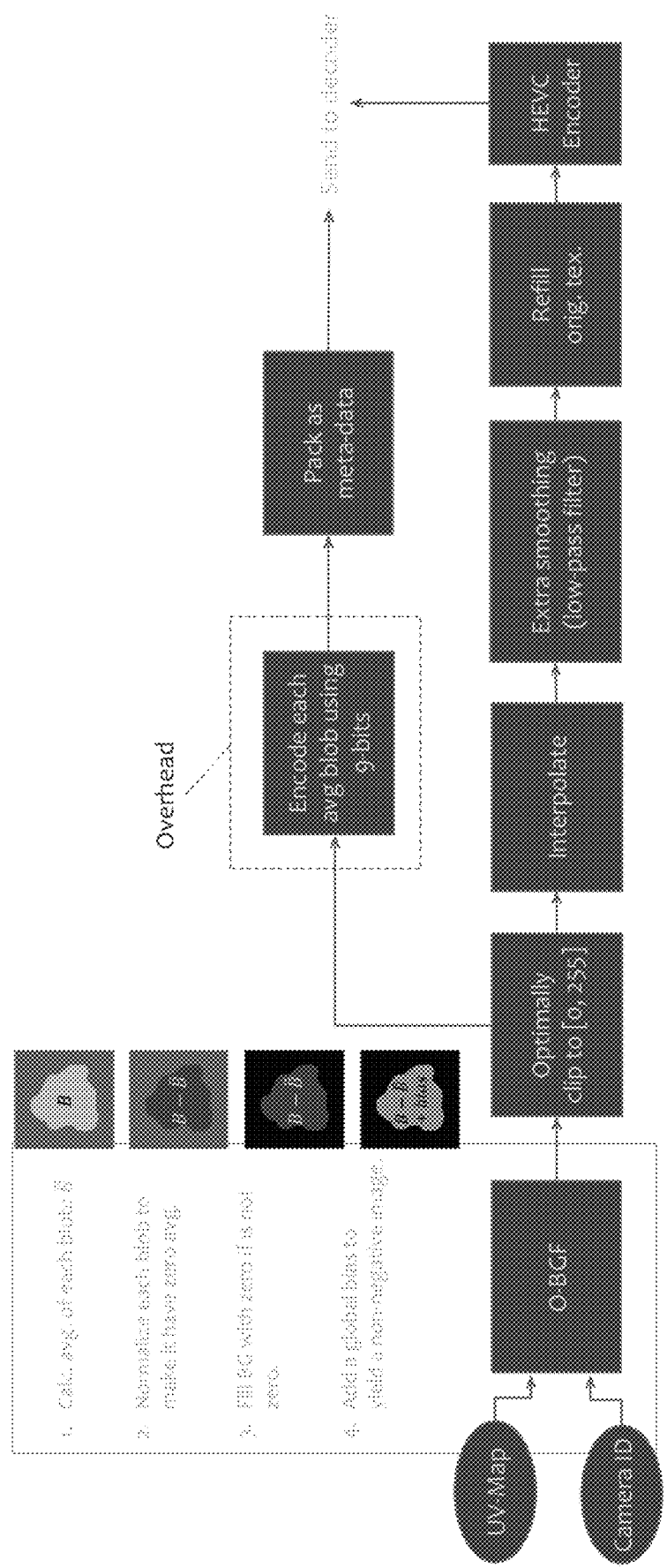
FIG. 6E schematically shows steps of an optimized background fill technique according to another embodiment.

In some embodiments, the pre-processing method may use either ad-hoc background filling (AdH-BGF) or optimized background filling (O-BGF), as illustrated in FIGS. 6D and 6E respectively.

In a third set of embodiments, the coding carried out at step 408 comprises a chroma sub-sampling scheme (down-sampling and up-sampling) that considers the depth and color value of the projected points in the first 2D image, and prevents colors leaking within patches, so that further, standard, processing will provide a compressed image substantially free of such artefacts. The idea here is that the patch creation process analyzes the color content of the patch, preventing potential patch formation that would lead to color leaking (for example, by creating thin color edges).

Figure 7A:
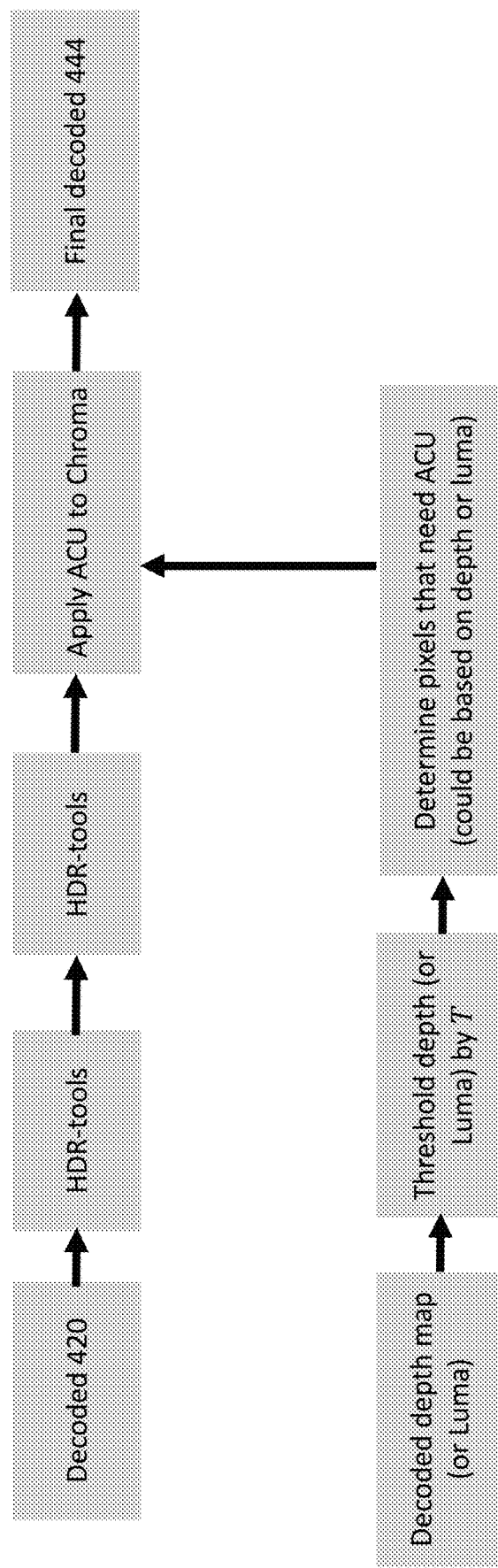
FIG. 7A shows steps for applying an adaptive chroma up-sampling technique according to one embodiment.
Figure 7B:
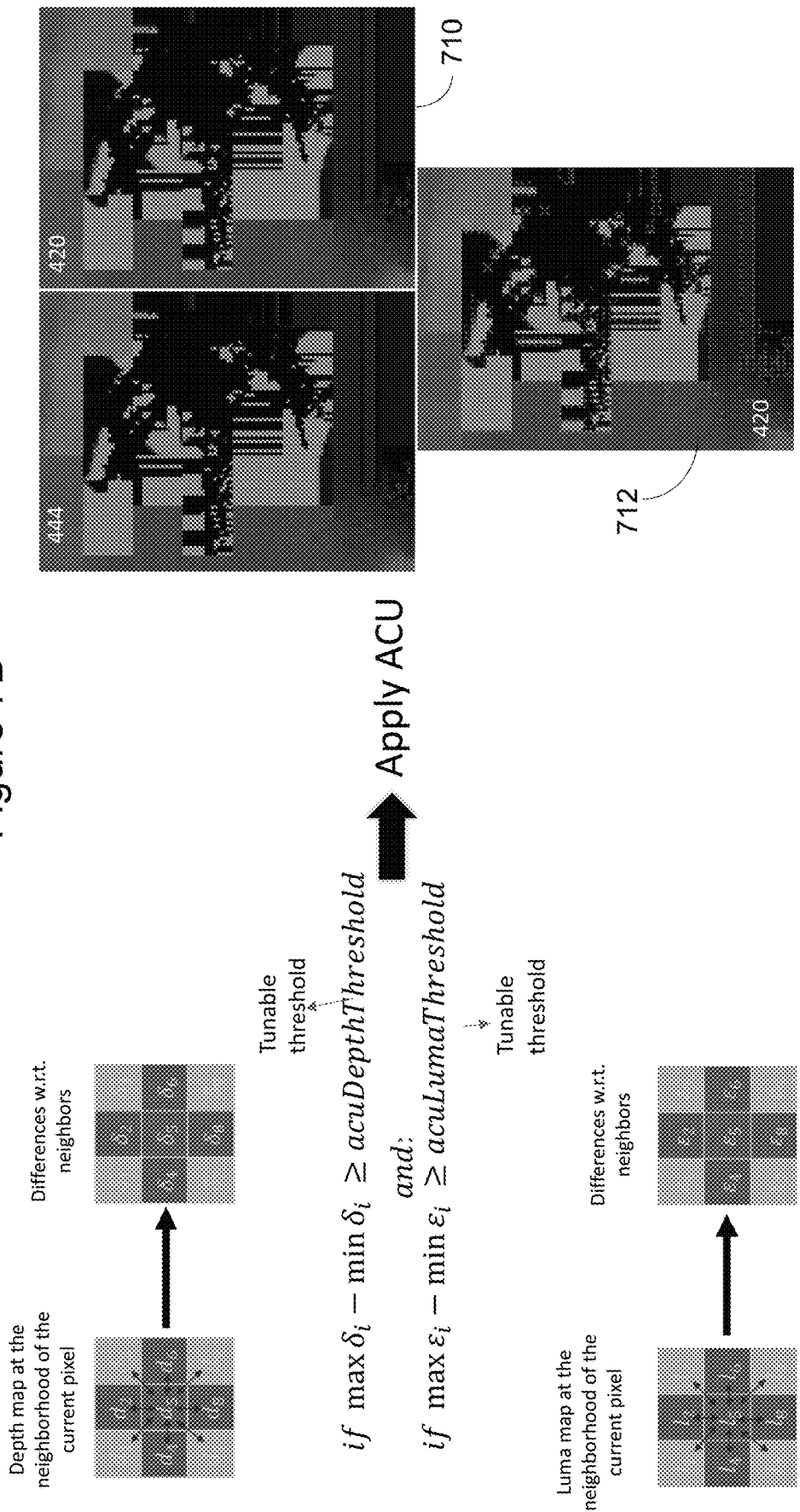
FIG. 7B illustrates steps for the determination of pixels affected by color leakage, as performed within the technique of FIG. 7A.

In a fourth set of embodiments, the decoding carried out at step 408 comprises a post-filtering operation that is able to detect color leaking using luminance and depth, which improves the identification of surfaces and possible artificial color edges within patches. The detected, potentially problematic positions will then be up-sampled using an adaptive filtering process, producing an output that can be further processed in the standard way to provide a compressed 2D image free of those color artefacts. FIG. 7A schematically illustrates one way in which adaptive chroma up-sampling (ACU) may be implemented. FIG. 7B illustrates in more detail how pixels experiencing color leakage may be detected, using depth and/or luma maps for the neighborhood of each current pixel. The problem of color leakage created using a "420" coding scheme is apparent in view 710, and in view 712, where the problematic pixels are shown in green. FIG. 7C shows how the detected problems may be remedied, using interpolation around the problematic pixels, for either depth or luma, to create a result (716) with significantly reduced intra-patch color leakage in comparison to the same region of the original image if the ACU technique had not been applied (718).

FIG. 8 is a flowchart for a method 800 for reducing color leaking artefacts in an image formed by projection processing from 3D point clouds according to some embodiments of the present invention. At step 802, an input image comprising a first 3D point cloud is received. At step 803, the first 3D cloud is analyzed to detect a sub-set of points within that cloud whose projection onto a 2D image plane would cause color leakage artefacts to occur within projected patches. At step 804, the detected set-set of points is removed from the first 3D point cloud to form a second 3D point cloud. At step 806, the second 3D point cloud is classified into a plurality of 3D surface patches. At step 808, the 3D surface patches are projected onto a 2D image plane to form a first 2D image. At step 810, the first 2D image is coded to form a compressed 2D image, and at step 812, the compressed 2D image is provided as an output. This compressed output may be transmitted, and in due course decoded and decompressed as and when desired. Method 800 may be termed a "color-consistent patch projection" method, as it is aimed at ensuring color-consistency within the patches that are projected. In some cases (not shown) rather than remove the detected sub-set altogether, as shown at step 804, those points may be projected onto one or more other patches, where color leakage would not occur.

FIG. 9 illustrates the effectiveness of color-consistent patch projection in one exemplary case. View 902 on the left shows the result of detecting and removing pixels whose projection would result in intra-patch color leakage after projection, while view 904 on the right shows an image that would have been produced after naïve down-sampling followed by naïve up-sampling (i.e., removing every other row/column and then copying every other row/column) in the absence of color-consistent patch projection.

Embodiments described herein provide significant improvements in the quality of images formed by projection processing from 3D point clouds. More specifically, embodiments reduce color leakage artefacts in such images, by employing one or more of the inventive techniques described, in the course of the image processing.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for reducing color leaking artefacts in an image formed by projection processing from a 3D point cloud, the method comprising:
   receiving an input image comprising the 3D point cloud;
   classifying the 3D point cloud into a plurality of 3D surface patches;
   projecting the 3D surface patches onto a 2D image plane to form a first 2D image;
   processing the first 2D image, by coding, transmitting and decoding, to form a final 2D image; and
   providing the final 2D image as an output;
   wherein processing comprises coding comprising background filling of pixels between patches to reduce inter-patch color leakage in the final 2D image;
   wherein background filling of pixels between patches comprises:
      for each patch, displacing active pixels at a patch border by a safeguard distance towards the patch interior; and
      for each patch, filling the safeguard distance with a background fill.

2. The method of claim 1, wherein the safeguard distance is selected to be less than or equal to 3 pixels.

3. The method of claim 1, additionally comprising processing the final 2D image to reconstruct an output 3D point cloud;
   wherein the background-filled pixels in the safeguard distance are used to replicate information across patches, such that patch seam mismatch artefacts are minimized in the reconstruction.

4. A method for reducing color leaking artefacts in an image formed by projection processing from a 3D point cloud, the method comprising:
   receiving an input image comprising the 3D point cloud;

classifying the 3D point cloud into a plurality of 3D surface patches;
projecting the 3D surface patches onto a 2D image plane to form a first 2D image;
processing the first 2D image, by coding, transmitting and decoding, to form a final 2D image; and
providing the final 2D image as an output;
wherein processing comprises coding comprising background filling of pixels between patches to reduce inter-patch color leakage in the final 2D image;
wherein background filling of pixels between patches comprises:
    dilating each patch to increase the number of apparently active pixels;
    for each patch, displacing apparently active pixels at a patch border by a safeguard distance towards the patch interior; and
    for each patch, filling the safeguard distance with a background fill.

5. A method for reducing color leaking artefacts in an image formed by projection processing from a 3D point cloud, the method comprising:
receiving an input image comprising the 3D point cloud;
classifying the 3D point cloud into a plurality of 3D surface patches;
projecting the 3D surface patches onto a 2D image plane to form a first 2D image;
processing the first 2D image, by coding, transmitting and decoding, to form a final 2D image; and
providing the final 2D image as an output;
wherein processing comprises coding comprising background filling of pixels between patches to reduce inter-patch color leakage in the final 2D image;
wherein background filling of pixels between patches comprises an optimized background filling scheme comprising:
    calculating an average value for each blob of pixels in the first 2D image;
    normalizing values for pixels in each blob relative to the calculated average value; setting all background pixels to zero; and
    adding a global bias to all normalized pixels and zeroed background pixels to yield an image with no negative pixel values.

6. An apparatus comprising:
one or more processors; and
logic encoded in one or more non-transitory media for execution by the one or more processors and when executed operable to:
receive an input image comprising a 3D point cloud;
classify the 3D point cloud into a plurality of 3D surface patches;
project the 3D surface patches onto a 2D image plane to form a first 2D image;
process the first 2D image, by coding, transmitting and decoding, to form a final 2D image; and
provide the final 2D image as an output;
wherein processing comprises coding comprising background filling of pixels between patches to reduce inter-patch color leakage in the final 2D image;
wherein background filling of pixels between patches comprises:
    for each patch, displacing active pixels at a patch border by a safeguard distance towards the patch interior; and
    for each patch, filling the safeguard distance with a background fill.

7. The apparatus of claim 6, wherein the safeguard distance is selected to be less than or equal to 3 pixels.

8. An apparatus comprising:
one or more processors; and
logic encoded in one or more non-transitory media for execution by the one or more processors and when executed operable to:
receive an input image comprising a 3D point cloud;
classify the 3D point cloud into a plurality of 3D surface patches;
project the 3D surface patches onto a 2D image plane to form a first 2D image;
process the first 2D image, by coding, transmitting and decoding, to form a final 2D image; and
provide the final 2D image as an output;
wherein processing comprises coding comprising background filling of pixels between patches to reduce inter-patch color leakage in the final 2D image;
wherein background filling of pixels between patches comprises:
    dilating each patch to increase the number of apparently active pixels;
    for each patch, displacing apparently active pixels at a patch border by a safeguard distance towards the patch interior; and
    for each patch, filling the safeguard distance with a background fill.

9. An apparatus comprising:
one or more processors; and
logic encoded in one or more non-transitory media for execution by the one or more processors and when executed operable to:
receive an input image comprising a 3D point cloud;
classify the 3D point cloud into a plurality of 3D surface patches;
project the 3D surface patches onto a 2D image plane to form a first 2D image;
process the first 2D image, by coding, transmitting and decoding, to form a final 2D image; and
provide the final 2D image as an output;
wherein processing comprises coding comprising background filling of pixels between patches to reduce inter-patch color leakage in the final 2D image;
wherein background filling of pixels between patches comprises an optimized background filling scheme comprising:
    calculating an average value for each blob of pixels in the first 2D image;
    normalizing values for pixels in each blob relative to the calculated average value; setting all background pixels to zero; and
    adding a global bias to all normalized pixels and zeroed background pixels to yield an image with no negative pixel values.

10. An apparatus comprising:
one or more processors; and
software encoded in one or more non-transitory computer-readable media for execution by the one or more processors and when executed operable to reduce color leaking artefacts in an image formed by projection processing from a 3D point cloud, by:
receiving an input image comprising the 3D point cloud;
classifying the 3D point cloud into a plurality of 3D surface patches;
projecting the 3D surface patches onto a 2D image plane to form a first 2D image;

processing the first 2D image, by coding, transmitting and decoding, to form a final 2D image; and providing the final 2D image as an output;

wherein processing comprises coding comprising background filling of pixels between patches to reduce inter-patch color leakage in the final 2D image;

wherein background filling of pixels between patches comprises:

for each patch, displacing active pixels at a patch border by a safeguard distance towards the patch interior; and for each patch, filling the safeguard distance with a background fill.

11. The apparatus of claim 10, wherein the safeguard distance is selected to be less than or equal to 3 pixels.

12. An apparatus comprising:

one or more processors; and software encoded in one or more non-transitory computer-readable media for execution by the one or more processors and when executed operable to reduce color leaking artefacts in an image formed by projection processing from a 3D point cloud, by:

receiving an input image comprising the 3D point cloud;

classifying the 3D point cloud into a plurality of 3D surface patches;

projecting the 3D surface patches onto a 2D image plane to form a first 2D image;

processing the first 2D image, by coding, transmitting and decoding, to form a final 2D image; and providing the final 2D image as an output;

wherein processing comprises coding comprising background filling of pixels between patches to reduce inter-patch color leakage in the final 2D image;

wherein background filling of pixels between patches comprises:

dilating each patch to increase the number of apparently active pixels;

for each patch, displacing apparently active pixels at a patch border by a safeguard distance towards the patch interior; and for each patch, filling the safeguard with a background fill.

* * * * *